April 7, 1953  E. W. GARDINOR ET AL  2,633,957
CLUTCH
Filed Jan. 19, 1950  5 Sheets-Sheet 1

Inventors
ELLIOTT W. GARDINOR
CURT I. JOHNSON
EUGENE J. LAMB
Geoffrey Knight
Attorney

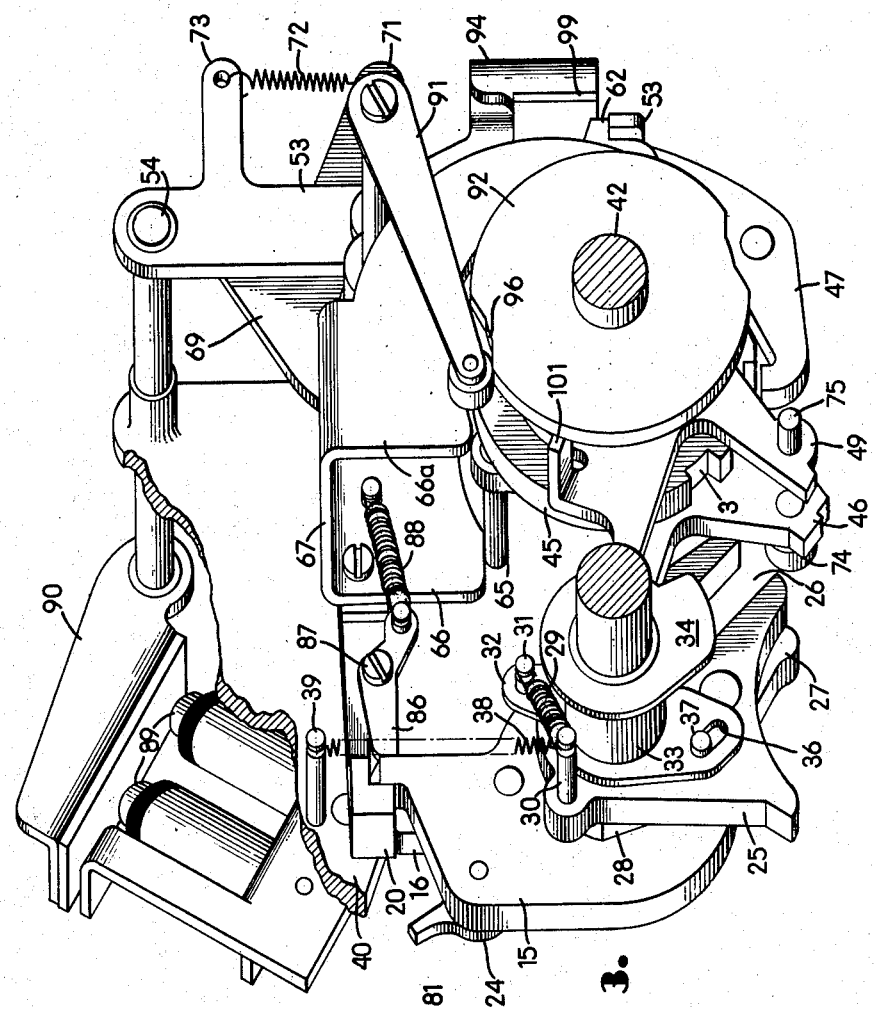

April 7, 1953 E. W. GARDINOR ET AL 2,633,957
CLUTCH
Filed Jan. 19, 1950 5 Sheets-Sheet 3

Inventors
ELLIOTT W. GARDINOR
CURT I. JOHNSON
EUGENE J. LAMB
Geoffrey Knight
Attorney April 7, 1953  E. W. GARDINOR ET AL  2,633,957
CLUTCH
Filed Jan. 19, 1950  5 Sheets-Sheet 4

Inventors
ELLIOTT W. GARDINOR
CURT I. JOHNSON
EUGENE J. LAMB
Geoffrey Knight
Attorney Patented Apr. 7, 1953

2,633,957

UNITED STATES PATENT OFFICE 2,633,957

CLUTCH

Elliott W. Gardinor, Conklin, and Curt I. Johnson and Eugene J. Lamb, Vestal, N. Y., assignors to International Business Machines Corporation, New York, N. Y., a corporation of New York Application January 19, 1950, Serial No. 139,418

16 Claims. (Cl. 192—148)

1

This invention relates to a clutch mechanism for starting and stopping a load in a shock-free manner.

A particular object is to provide a clutch mechanism capable of starting a load device smoothly from a stationary to a running condition and of clutching it to a driving mechanism in a predetermined angular relation.

Another object is to provide a clutch mechanism between a power shaft and a load shaft which can declutch the load shaft and bring it smoothly to a predetermined stopped position.

Another object of the invention is to provide for accelerating a load shaft smoothly from a fixed starting position to full angular velocity and for decelerating the load shaft smoothly from full angular velocity to the fixed starting position and for transferring control of the load shaft to and from a constantly running power shaft between acceleration and deceleration.

Another object is to provide a device as described in the preceding paragraph, including means to insure the clutching of the load shaft to the power shaft in a predetermined angular position.

A preferred embodiment of the invention is a clutch mechanism for intermittently coupling a printing unit to a constantly running tabulating machine drive. For one type of operation of a printing tabulator, known as non-listing operation, the printer is normally idle and is set in operation only intermittently, for a total print cycle at the end of each card group and for a group indicate cycle at the beginning of the next card group. Since the card groups may contain any number of cards the print clutch must be controlled automatically from the cards. Also, since the printer must run in a predetermined angular relation to the tabulator drive mechanism, the print clutch must be of a type which can become engaged in only one angular relation to the tabulator drive mechanism. Heretofore the clutching means has consisted of a dog on the printer driven shaft and a continuously running single-notch disk on the tabulator drive, which picks up the dog instantaneously from a stationary position. Also, the printer mechanism must be stopped in a predetermined position and is allowed to coast to the stopping position with enough speed to insure that it will not stop before reaching this position. Such a clutch is not free from shock in starting and stopping.

Accordingly, it is a particular object of the invention to provide a clutching mechanism for

2 a printing tabulator characterized by low shock in starting and stopping.

It is also a particular object of the invention to provide a clutching mechanism of the kind described in the paragraph above, which can be controlled for both starting and stopping by a uniformly timed impulse, which will be recognized as a start impulse or a stop impulse, depending upon whether the printer is idle or running.

Other objects of the invention will be pointed out in the following description and claims and illustrated in the accompanying drawings, which disclose, by way of example, the principle of the invention and the best mode, which has been contemplated, of applying that principle.

In the drawings:

Fig. 3 is a perspective view of the device.

Fig. 4 is a sectional view taken on line 4—4 of Fig. 2.

Figure 2:
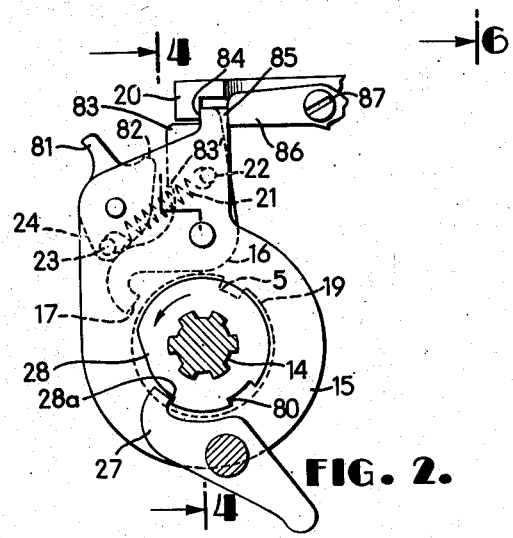
Fig. 2 is a view taken on line 2—2 of Fig. 5 showing the drive mechanism for the load shaft.
Figure 5:
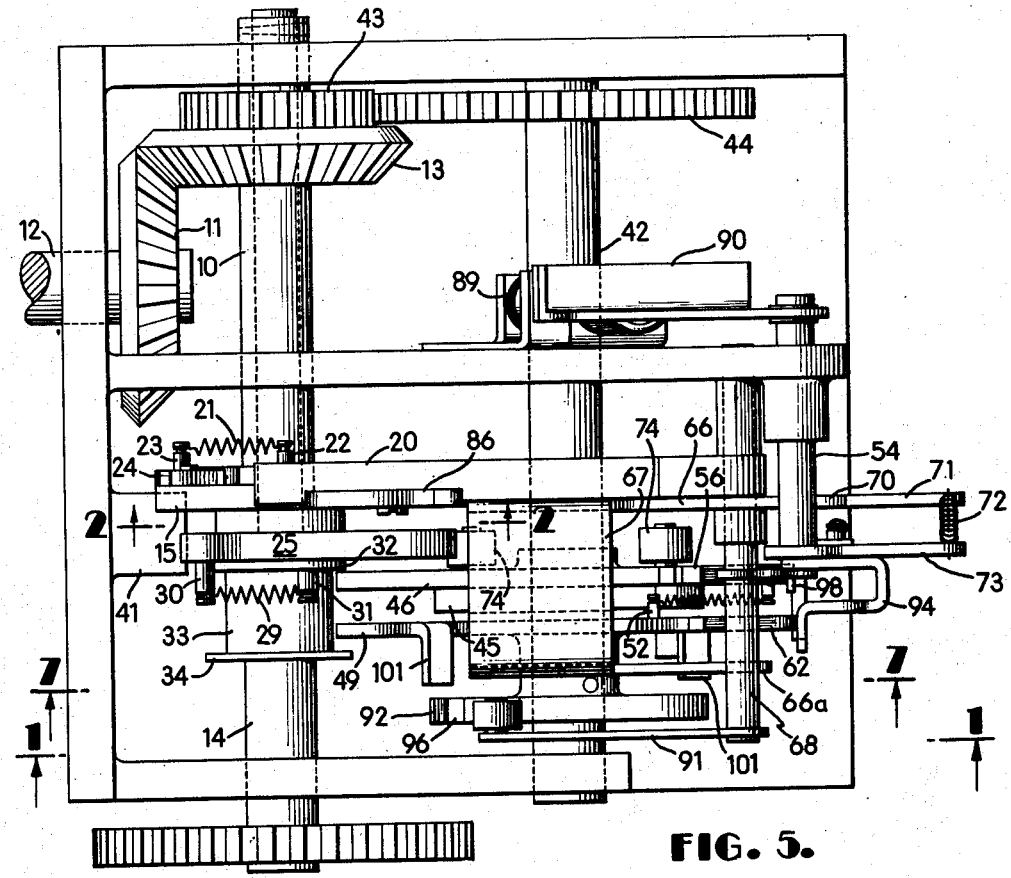
Fig. 5 is a plan view of the device.
Figure 6:
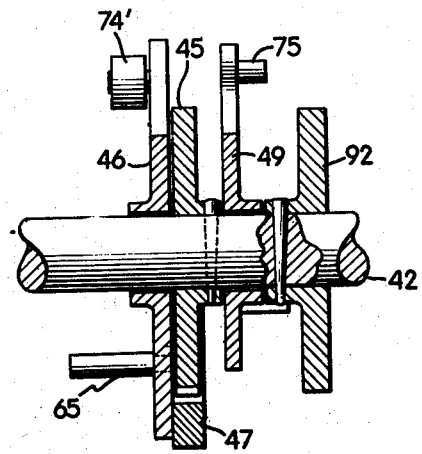
Fig. 6 is a sectional view taken on line 6—6 of Fig. 1.

The illustrative example shown in the drawings is a clutch mechanism adapted for driving the print unit of a printing tabulator. The power mechanism to which the print unit is to be clutched includes a power shaft 10 (Fig. 5) to which power is continuously applied by means of a gear 11 fixed on an input drive shaft 12 and meshing at right angle with a gear 13 fixed on said power shaft 10. The input drive shaft 12 may be driven from an electric motor or other suitable source of power and may be, for example, the shaft 17 of the patent to Robert E. Paris, No. 2,398,036. A load shaft 14 mounted coaxially with the power shaft 10 has a driven arm 15 (Fig. 2) keyed at its end, which pivotally supports a dog 16. The hooked end 17 of the dog 16 is adapted to engage in a notch 5 of a flange 19, fixed on the end of said power shaft 10, for the purpose of driving said load shaft 14. In the idle condition of the load shaft 14 the dog 16 and the driven arm 15 are both latched by a latch 20, so that said dog 16 is held out of the notch 5 in the continuously rotating flange 19. A spring 21 stretched between a pin 22 on the dog 16 and a pin 23 on a cam member 24 pivoted to the driven arm 15 tends to rock the dog 16 and the cam member 24 counter-clockwise on the arm 15. When the latch 20 is lifted, in a manner to be described, the dog 16 can rock into engagement with the flange 19. The notch 5 catches up to the hooked end 17, which drops into the notch and at this time the cam member 24 rocks to lock the dog 16 in said notch 5. The load shaft 14 will then turn continuously at the same rate as the power shaft 10.

In accordance with the invention means are provided to accelerate the load shaft 14 prior to engagement of the dog 16 in the notch 5, so that at the time this engagement occurs the load shaft 14 will be turning at the same rate as the power shaft 10. For this purpose there is mounted on the load shaft 14 a Geneva arm 25 (Fig. 1) having an open ended radial slot 26. The Geneva arm 25 is revolvably mounted on said load shaft 14, but has pivoted thereto a dog 27 which normally engages behind a shoulder 28a on a disk 28 keyed to the load shaft. A spring 29 is connected to a pin 30 on the Geneva arm 25 and anchored at its other end to a pin 31 on a member 32, said member 32 being an integral part of a sleeve 33, loosely mounted on the load shaft 14. The opposite end of sleeve 33 has fixed thereto a cam member 34 as shown in Fig. 3. The Geneva arm 25 has a large hole 35 through which extends a pin 37. This pin 37 engages a slanting slot 36 in the member 32 and as said member 32 is urged in a counter-clockwise direction by the action of the spring 29, the oblique side of the slot 36 will pivot the dog 27 clockwise against the disk 28. Another spring 38 hooked over said pin 30 on the Geneva arm 25 and anchored at its other end to a pin 39 in the side plate 40 tends to rock the Geneva arm 25 in a clockwise direction against a stop 41.

A counter shaft 42 (Fig. 5) is driven from the power shaft 10 at half the speed of said power shaft by a gear 43 pinned to said power shaft meshing with a gear 44 pinned to said counter shaft. Fixed to the counter shaft 42 is a ratchet disk 45 (Fig. 7) which rotates clockwise continuously at half the speed of the power shaft. A drive arm 46 (Fig. 1) is revolvably mounted on the counter shaft 42 and has pivoted thereto a dog 47 with a hooked end adapted to engage any one of four teeth 1, 2, 3, or 4, on said ratchet disk 45, as determined by control means to be described later. The dog 47 has a slotted arm in which engages a pin 48 on a spider 49, which is also revolvably mounted on the counter shaft 42 and is connected to the drive arm 46 by a spring 50 stretched between a pin 51 on the drive arm and a pin 52 on the spider. The force of the spring 50 tends to rock the spider 49 clockwise, to urge the dog 47 into engagement with the ratchet disk 45. A latch 53 fixed to a shaft 54 journaled in a bearing of the side wall 40 has a hooked end which normally latches a finger of the drive arm 46 and a finger of the spider 49. When so latched the spider 49 moves back against the force of the spring 50 to retract the dog 47 from the ratchet disk 45.

The latch 53 is operated by an electromagnet 89 (Figs. 1 and 3) acting upon an armature 90 fastened to the rear end of shaft 54. A tabulating machine of the type for which the illustrative clutch mechanism is designed is provided with cam operated contacts, such as the contacts CR2, etc., of the patent to John R. Peirce, No. 2,042,324. One of these contacts can be used as a source of impulses for the electromagnet 89. The cam operated contacts determine the time in the cycle during which the impulse is to be transmitted and other contacts controlled by the card reading means determine whether the impulse will get through to the magnet 89 in any particular cycle.

The latch is restrained against releasing movement except during a brief portion of the cycle while the magnet is being energized. For this purpose there is mounted on the shaft 42 a disk 92 on which rides a roller on a follower lever 91. This lever is pivoted on the stationary shaft 68 and has an arm extending downward to the right with a forked end embracing a stud 93 on a lever 94. The lever 94 is pivoted by a stud 95 to the latch 53. Since the bottom end of the lever 94 rests against the end of one of the fingers of the spider, such as 60, when the roller on lever 91 is on a high part of the cam 92 the stud 95, and therefore the latch 53, are held in by a third class lever action.

Figure 1:
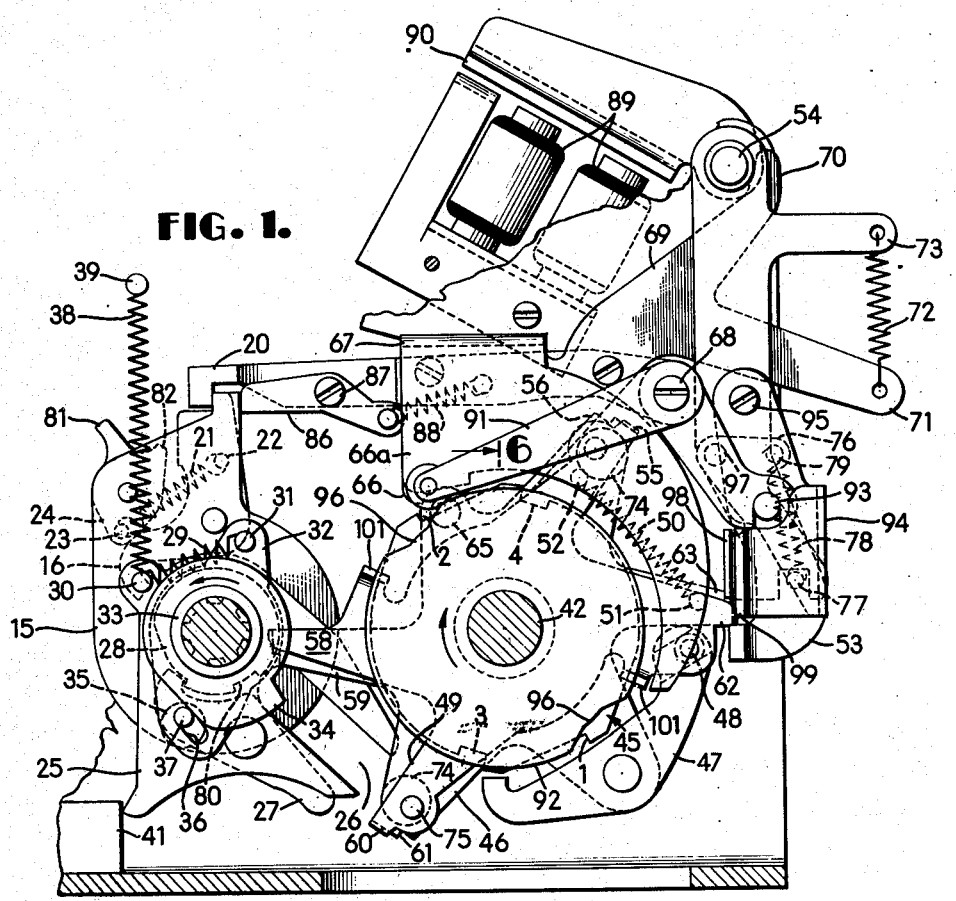
Fig. 1 is a sectional side view of the device taken on line 1—1 of Fig. 5.

The drive arm 46 and spider 49 have four fingers each. For an accelerating operation the drive arm and spider are released by a movement to the right of the latch 53. As said latch 53 is tripped, the spider 49 will rotate clockwise slightly due to the action of the spring 50 thereby causing the dog 47 to pivot clockwise against the periphery of the ratchet disk in front of the tooth 1 (Fig. 1). It is to be noted that the fingers on the spider 49 are slightly longer than the fingers on the drive arm 46 so that as the spider rotates slightly clockwise a finger on the spider will prevent the latch 53 from returning to its latching position until after the dog 47 has engaged a tooth on the ratchet disk 45 and the drive arm 46 has rotated clockwise past the latch 53. The latch 53 will return in time to latch the fingers 55 and 56 of the spider and drive arm, respectively, disengaging the dog 47, after 55° of rotation of the drive arm. For a decelerating operation the latch 53 is again rocked to the right, the dog 47 engages with a tooth 4 on the ratchet disk, and the drive arm and spider rotate 125°, at the end of which movement, the latch 53 having returned to the left, the fingers 58 and 59 are engaged by it and the dog 47 is disengaged from the ratchet disk. The same operations are repeated for a second accelerating and decelerating operation, the drive arm 46 and spider 49 being successively latched by the fingers 60 and 61 and the fingers 62 and 63.

The teeth 2 and 3 coact with the dog 47 in the same way as the teeth 1 and 4, respectively, depending upon the relative position of the dog 47 and disk 45 when the impulse to magnet 89 arrives.

The complete operation of the clutch will now be described, with reference to the timing chart, Fig. 9. In Fig. 1 the parts are shown just as the roller of the follower 91 is about to ride into a notch 96 and release the latch 53 to the control of the electromagnet 89, namely, at about 110° machine time. In the diagram the abscissa represent cycle time and the ordinates represent angular position, zero position being on the line of centers of the shafts 14 and 42, at the right side of each shaft. The latching surface of the latch 53 is at 0°.

Figure 9:
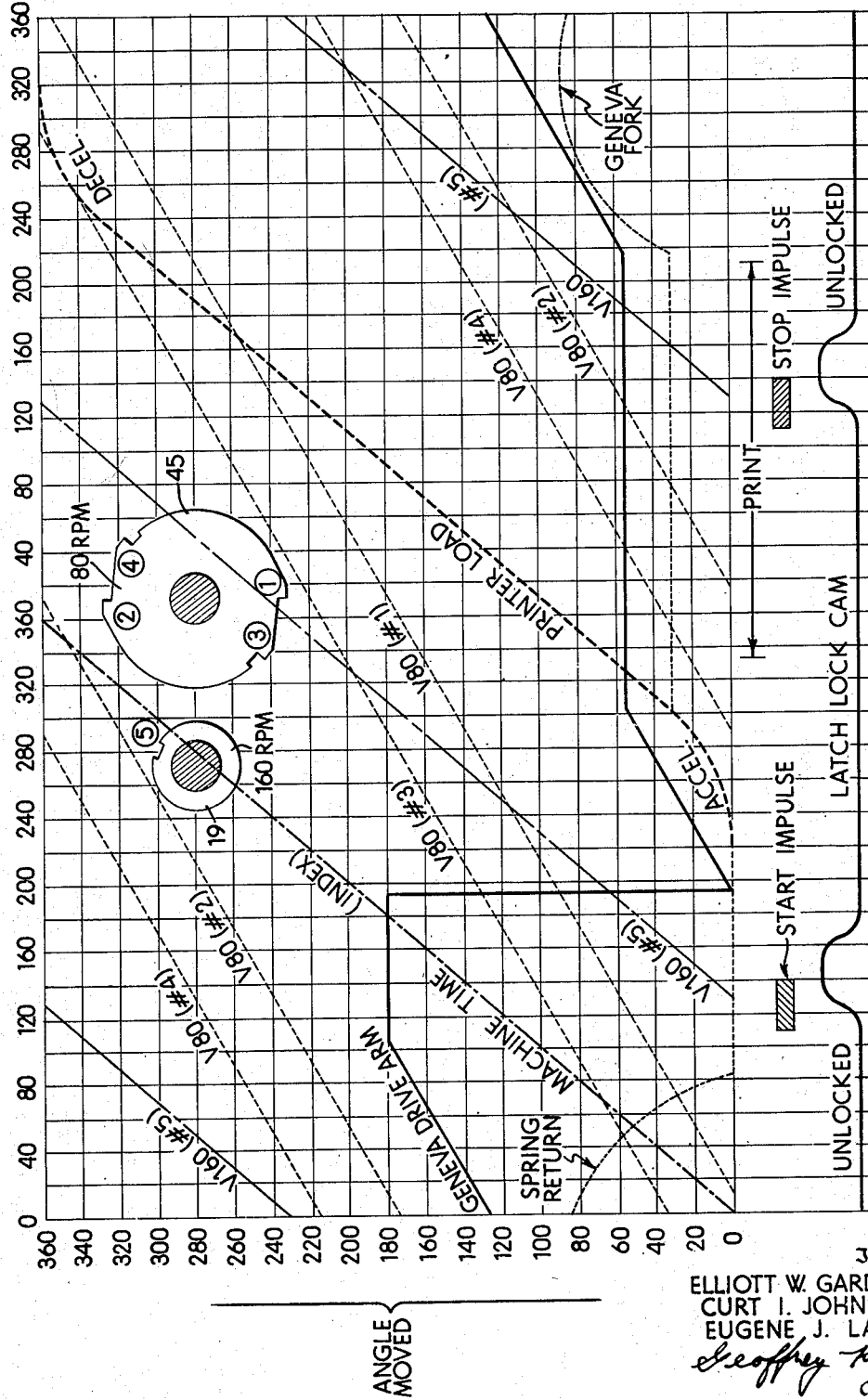
Fig. 9 is a timing diagram.

If the magnet 89 receives an impulse at 110° in the first cycle shown in Fig. 9, the latch 53 will be released by the latch lock cam 92 after the tooth 3 has passed the dog 47 and before the tooth 1 has reached the dog 47. The lines V80 (#3)

and V80 (#1), representing the movements of the teeth 3 and 1 of the disk 45, respectively, show that the dog 47, the engaging edge of which is at 90°, falls between the teeth 3 and 1, when the latch 53 is released by action of the latch lock cam. At approximately 198° the tooth 1 picks up the dog 47 and the Geneva drive arm begins to move. Immediately one of two pins 65 (Figs. 1 and 3) mounted 180° apart on drive arm 46 cams upward a side plate 66 of a bracket 67 fixed to the latch arm 20. An extension 69 of said side plate 66 has an arm 71 to which is attached a spring 72 the other end of which is anchored to an arm 73 of the latch 53. The spring 72 rocks the bracket 67 so that another arm 70 thereof normally rests against a stud 54. When side plate 66 is cammed upward, latch 20 is lifted, releasing the driven arm 15 and dog 16. The movement of the latch 53 to the right is timed so that the hooked end of the dog 16 drops onto the periphery of the flange 19 in advance of the notch 5. It is the function of the accelerating mechanism to accelerate the driven arm 15 at such a rate that when the notch 5 reaches the hooked end 17 of the dog, said dog will be traveling counter-clockwise at the same rate as the notched flange 19.

Mounted 180° apart on the drive arm 46 are two driving elements in the form of rollers 74. The rollers 74 are positioned to enter the slot 26 of the Geneva arm 25. The one standing in front of the slot at the beginning of a clutch-engaging cycle enters the slot shortly after the drive arm 46 begins to rotate, namely at about 220° machine time. This occurs after the latch 20 has been lifted and the driven arm 15 released. As said roller 74 moves radially in the slot 26 it accelerates the Geneva arm 25 (see curve "Geneva Fork" in Fig. 9). It should be noted that the distance between the axis of the roller 74 and the axis of the counter shaft 42 is slightly greater than two thirds the distance between the axes of the shafts 42 and 10. In other words, the distance between the axis of roller 74 and the axis of counter shaft 42 is slightly greater than twice the distance between the axis of the roller 74 and the axis of the power shaft 10, when the roller 74 arrives at the line of centers between the power shaft 10 and the counter shaft 42. Therefore, when the roller axis reaches a position just in front of the line of centers, (5° in front of it in the present case) the Geneva arm 25 and the driven arm 15 are rotating at the same rate as the power shaft because the counter shaft 42 is turning at half the speed of the power shaft 10.

Figure 7:
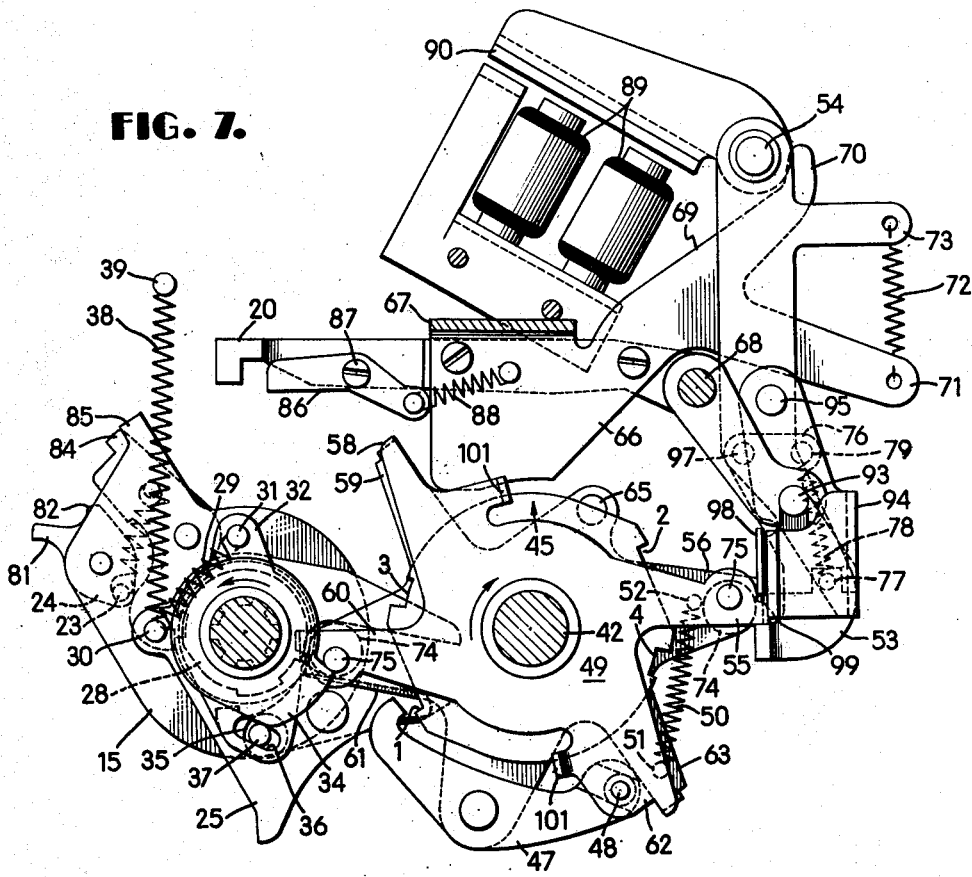
Fig. 7 is a sectional view taken on line 7—7 of Fig. 5, showing the parts in a different position from that of Fig. 1.

The timing of the mechanism is such that at this moment, namely, about 302° machine time, the notch 5 in the flange 19 comes under the hooked end of the dog 16 and allows the dog to drop into the notch with the parts in a substantially stationary relative condition. Notch number 5 is approximately 174° from its zero position, as shown by the line V160 (#5) in Fig. 9. At this moment the drive arm 46 is stopped at finger 56 by the latch 53, the spider 49 having been stopped just previously by its finger 55 and the dog 47 disengaged. This position of the parts is shown in Fig. 7.

Meanwhile, shortly before the drive arm 46 was stopped, a pin 75 on the spider 49 moved in front of the nose on cam 34 and when the spider 49 was stopped by the latch 53 the cam 34 and member 32 were held stationary, while the Geneva arm 25 continued its movement and the dog 27 was cammed out of engagement with the notched disk 28. Thus, when the Geneva arm is stopped by the latching of the drive arm 46 the dog 27 is clear of the disc 28 and the load shaft 14 is free to rotate with the power shaft 10. The Geneva arm 25 is held by the roller 74 of the drive arm 46 which is latched by the latch 53 in the position where the axis of the roller 74 is just 5° in advance of the line of centers between the power shaft 10 and the counter shaft 42. A keeper 76 pivotally attached to the latch arm 53 is urged to pivot clockwise against a stud 77 on the latch 53 by means of a spring 78, stretched between said stud 77 and a pin 79 on the keeper. When the finger 56 brushes past the keeper 76 into latching position, a flange 98 on the keeper springs behind the end of finger 56 and serves to hold the drive arm 46 against the force of spring 38.

Just before the Geneva drive arm 46 is latched up, a lug 101 on spider 49 engages under a side plate 66a (Fig. 1) on bracket 67 and stops, when the spider latches up, in position to hold the side plate 66a and the latch 20 in elevated position. The latch is thereby held clear of the driven arm 15 during the running condition of the clutch.

At this point it can be seen by referring to the timing diagram shown in Fig. 9 that after a start impulse had been initiated to effect the tripping of the latch 53, the Geneva arm 25 rotated approximately 55° during which time the load shaft 14 (referred to as printer load on said timing diagram) was accelerated until it had reached the same rate of speed as the power shaft 10. At the end of this 55° of rotation the Geneva arm 25 is stopped and the load shaft and power shaft continue to rotate at the same speed.

The timing diagram shows another impulse occurring in the next machine cycle, which will have the function of a stop impulse. When the notch 96 in the latch lock cam releases the latch 53, the latch is again moved to the right, allowing the spider 49 to jump ahead far enough to move the lug 101 from under the side plate 66a. This allows the latch 20 to drop to its lower position. The movement of the pin 75 when the spider is released also allows the unit 34, 33, 32 to move counter-clockwise, under the pull of spring 29, and cam the dog 27 against the disk 28. The disk is rotating counter-clockwise and the dog strikes it some distance in advance of the notch 80. When the spider is released the dog 47 stands at about 145° and, when moved by the spider 49, engages the disk 45 well in advance of tooth #4, as shown by line V80 (#4) in Fig. 9. The dog is picked up by tooth #4 at approximately 217° machine time, shortly after the dog 27 has dropped into the notch 80 of disk 28. The notch 80 is somewhat wider than the nose of the dog 28, to provide good clearance, assuring that the dog is in the notch before the Geneva arm starts to move.

The Geneva arm 25 begins to move at a high rate, because the roller 74 is almost at its nearest approach to the axis of the power shaft 10, and moves for a short time at an accelerated rate, until the axis of the roller passes the line of centers between the power shaft 10 and the counter shaft 42. This accelerated movement of the Geneva arm causes the dog 27 to catch up to the forward shoulder of the notch 80 on disk 28, in position to apply a continued force thereto, which will drive the load shaft 14 to the normal latching position. The dog 27 strikes the forward shoulder of the notch 80 a little before its angular velocity has been reduced to that of the load shaft 14, whereby it accelerates the load shaft slightly and frees the nose 17 of dog 16 in the notch 5.

Meanwhile a nose 81 on cam member 24 has struck the hooked end of the latch 20, rocking the cam 24 clockwise. The rocking of the cam 24 causes its arm 82 to engage a face 83 on the dog 16 and to disengage the dog 16 from the notch 18 in the power flange 19. This occurs at the moment when the nose 17 of dog 16 has been freed in notch 5 and the disengagement of the dog occurs without frictional hindrance. From this time on the movement of the load mechanism to the latched position under its momentum is assisted and insured by the Geneva arm 25. Also, if the load shaft tends to overrun the decelerating Geneva arm, it is held back by the action of the dog 27 against the rear end of notch 80.

Figure 8:
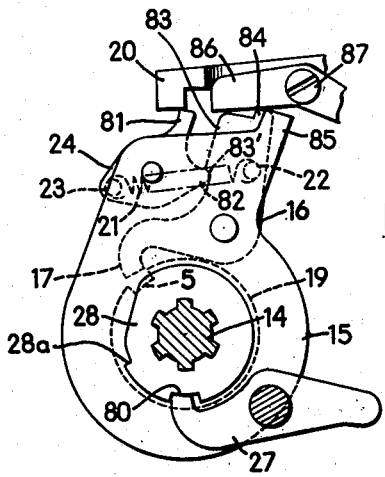
Fig. 8 is a view similar to Fig. 2 showing the drive mechanism disengaged from the load shaft.

When the arm 82 of the cam 24 completes the disengagement of the dog 16 it hooks under the shoulder 83' on the dog and latches the same out of engagement with the notched flange 19 (see Fig. 8). The nose 81 of the cam travels on past the hook of the latch 20. Soon afterward the nose 84 of the dog 16 strikes the hook of the latch 20, rocking the dog clockwise and releasing the cam 24. Finally the nose 85 of the driven arm 15 strikes the latch 20, and a keeper 86, urged counter-clockwise about a pivot stud 87 by a spring 88, drops behind the nose 85 to latch the load mechanism in its idle position.

The latching of the load mechanism occurs just as the Geneva arm 25 is approaching the limit of its movement and is therefore traveling slowly. The final latching of the load mechanism is consequently relatively free from shock.

When the roller 74 rides out of the slot 26, the Geneva arm remains in an elevated position held against the pull of spring 38 by the abutment of the dog 27 against the rear end of slot 80. To release the dog and allow the Geneva arm to return to its lower position the pin 65 on the driving arm 46 is arranged to strike the tail of dog 27 and lift the dog from notch 80. As the driving arm continues its rotation the pin 65, which is traveling along the lower edge of the arm 25 and the dog 27, comes to a beveled surface of the arm 25, which allows the arm to drop while the dog is held released. The arm drops far enough to bring the nose of dog 27 past the rear shoulder of notch 80, then the tail end of the dog drops off of the pin 65. Finally the pin clears the end of the arm 25, which drops against the abutment 41. The dog 27 drops behind the shoulder 28a, in readiness for the next acceleration. The driving arm 46 and spider 49 continue their rotation until they latch up in the manner previously described.

From the time the lug 101 passes the line of centers between the shafts 42 and 68 it acts against an arcuate tail of the side plate 66a, to prevent the latch 20 from tilting up. Thereby it insures effective coaction of the nose 81 and the hooked end of latch 20. When the spider 49 is latched the lug 101 remains behind the tail of side plate 66a, to prevent the latch 20 from being accidentally released before the primary latch 53 is released.

While there have been shown and described and pointed out the fundamental novel features of the invention as applied to a single modification, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. In a clutch device, a rotary power member, a rotary load member coaxial therewith, a Geneva arm mounted to rotate about the common axis of said members, means to drive said Geneva arm with an accelerating movement, then with a decelerating movement, means to stop said Geneva arm approximately between said movements, and means to clutch said load member alternately to said Geneva arm and to said power member.

2. In a clutch mechanism, a rotary power member, a rotary load member coaxial therewith, a Geneva arm pivoted to rotate about the axis of said power member and having an open ended radial slot, a driving arm rotatable on an axis parallel to the axis of said power member and having a driving element adapted to enter the slot of said Geneva arm, means to rotate said driving arm about its axis through an angle such as to cause said driving element to enter said Geneva arm slot and to move with said Geneva arm to the vicinity of the plane including said parallel axes, means to stop said driving arm and said Geneva arm at the end of said movement, means to clutch said load member to said Geneva arm during the movement of the latter by said driving element, means to clutch said load member directly to said power member at the end of said movement of the Geneva arm, and means to declutch said load member from said Geneva arm at the end of the movement of the latter.

3. In a clutch device, a constantly rotating power member, a rotary load member coaxial therewith, a Geneva arm mounted to rotate about the common axis of said members, means to clutch said load member to said Geneva arm, means to impart an accelerating movement to said Geneva arm and thereby to said load member, means to stop said Geneva arm when said load member reaches the same rate of speed as said power member, means to clutch said load member to said power member at the time said Geneva arm is stopped, and means to declutch said load member from said Geneva arm at the time the latter is stopped.

4. In a clutch mechanism, a rotary power member, a rotary load member coaxial therewith, a Geneva arm pivoted to rotate about the axis of said power member and having an open ended radial slot, means to clutch said load member to said Geneva arm, a shaft having an axis which is parallel to the axis of said power member, means for rotating said power member, means for rotating said shaft at half the speed of said power member, a driving arm mounted on said shaft and having a driving element adapted to enter the slot of said Geneva arm, the distance from said driving element to the axis of said shaft being at least two thirds of the distance between the axes of said shaft and said power member, means to clutch said driving arm to said shaft, whereby said driving element enters said slot and moves said Geneva arm at an accelerating angular velocity, means to stop said Geneva arm when said load member reaches the same rate of speed as said power member, means to clutch said load member to said power member at the time said Geneva arm is stopped, and means to declutch said load member from said Geneva arm at the time the latter is stopped.

5. In a clutch device, a constantly rotating power member having a notched flange mounted thereon, a rotary load member coaxial therewith and having a driven arm attached thereto, a dog fixed to said driven arm, a latch normally latching said dog and said driven arm, a Geneva arm pivoted to rotate about the axis of said power member and having an open ended radial slot, a notched disk fixed to said load member, a second dog pivoted on said Geneva arm and normally engaging a notch of said notched disk, a shaft having an axis parallel to the axis of said power member, means for rotating said power member and said shaft, a driving arm revolvably mounted on said shaft and having a driving element adapted to enter the slot of said Geneva arm, means to clutch said driving arm to said shaft, whereby said driving element enters said slot and moves said Geneva arm at an accelerating angular velocity, a pin mounted on said driving arm and adapted to unlatch said first named dog and driven arm just prior to said accelerating movement, a latch adapted to stop said driving arm and thereby said Geneva arm when said load member reaches the same rate of speed as said power member, the timing being such that said first named dog engages a notch of said notched flange at the time said Geneva arm is stopped, and a cam member adapted to disengage said second dog from the notch of said disk at the time that said Geneva arm is stopped.

6. A clutch device as in claim 5 wherein the means to clutch said driving arm to said shaft includes a dog pivoted to said driving arm and having a diagonally slotted arm, a spider revolvably mounted on said shaft and having a pin adapted to engage in the slot of said slotted arm, a spring connected between said spider and said driving arm tending to rock said spider against said latch, a ratchet disk fixed to said shaft, and means to release said latch from said spider and driving arm, thereby enabling said pivoted spider to jump ahead of said driving arm, under the influence of said spring, and rock the dog pivoted to said driving arm into engagement with said ratchet disk.

7. In a clutch device, a constantly rotating power member, a rotary load member coaxial therewith, a Geneva arm pivoted to rotate about the axis of said power member and having an open ended radial slot, a driving arm rotatable on an axis parallel to the axis of said power member and having a driving element adapted to enter the slot of said Geneva arm, means to rotate said driving arm, whereby said driving element enters said slot and moves said Geneva arm at an accelerating rate, means to stop said driving arm and said Geneva arm at the end of said movement, means to clutch said load member to said Geneva arm during the movement of the latter by said driving element, means to clutch said load member directly to said power member at the end of said movement of the Geneva arm, means to again rotate said driving arm, whereby said driving element moves said Geneva arm at a decelerating rate, and means to declutch said load member from said power member during said decelerating movement.

8. In a clutch mechanism of the class described, a constantly rotating shaft, a rotary driving arm revolvably mounted on said shaft, a spider revolvably mounted on said shaft, a dog pivotally mounted on said driving arm, said spider having an arm with a pin extending therefrom engaged in a slot in said dog, a magnet, an armature for said magnet having an arm with a hooked end normally extending in the path of said driving arm and the arm of said spider, a spring connected between said spider and said driving member tending to rock said spider in the direction to cam said dog toward said shaft and to position the arm of said spider slightly ahead of said driving arm, a toothed disk fixed on said shaft, said magnet, when impulsed, being adapted to pivot said armature out of engagement with said driving arm and the arm of said spider whereby said spider will rotate and said dog will pivot into engagement with one of said teeth on said disk to drive said driving arm, and cam controlled means for suppressing the operation of said armature during certain portions of the clutch cycle.

9. In a clutch mechanism of the class described, a constantly rotating power member, a rotary load member coaxial therewith, a notched flange fixed to said power member, a driven arm keyed to said load member, a dog pivoted to said driven arm and spring biased toward said notched flange, a latch member normally latching said dog and said driven arm, whereby said dog is held out of engagement with said notched flange, a Geneva arm pivoted to rotate about the axis of said power member and having an open ended radial slot, a shaft having an axis parallel to the axis of said power member, means for rotating said shaft, a driving arm revolvably mounted on said shaft and having a driving element adapted to enter the slot of said Geneva arm, means to clutch said load member to said Geneva arm, means to clutch said driving arm to said shaft whereby said driving element moves said Geneva arm and hence said load member, a bracket fastened to said latch member, and a pin mounted on said driving arm adapted to engage said bracket to raise said latch member releasing said dog and driven arm.

10. A clutch as described in claim 9, wherein said means to clutch said driving arm to said shaft comprises a spider revolvably mounted on said shaft and having a limited movement in relation to said driving arm, a spring tending to move said spider in one direction in relation to said driving arm, another latch member adapted to latch said driving arm and said spider and thereby to move said spider back against the force of said spring, and an ear on said spider coacting with said bracket in one latched position of said spider to hold said first mentioned latch member out of the path of said dog and said driven arm, said ear being moved on release of said spider by said other latch member to release said bracket and allow said first latch to move into the path of said dog and said driven arm.

11. A clutch as described in claim 10, wherein said bracket has an arcuate extension coacting with said ear to lock said first latch in latching position while said spider is latched in another position, said ear being moved to unblock said arcuate extension when said spider is released from said other latched position.

12. In a clutch mechanism of the class described, a constantly rotating power member, a rotary load member coaxial therewith, a Geneva arm pivoted to rotate about the axis of said power member and having an open ended radial slot, a driving arm rotatable on an axis parallel to the axis of said power member and having a driving element adapted to enter the slot of said Geneva arm, means to rotate said driving arm whereby said driving element will move said Geneva arm at an accelerating angular velocity to the vicinity of the plane including said parallel axes, a disk fixed to said load member and having a notch, a dog pivoted to said Geneva arm and engaged in the notch of said disk during said accelerating movement, means to stop said driving arm and said Geneva arm at the end of said accelerating movement, a cam member loosely mounted on said load member, and connected with said dog so as to move the latter out of engagement with said notch when moved in one direction, a spring connected between said member and said Geneva arm tending to move said cam member in the other direction, and a stud fixed to said driving arm and coacting with said cam member to stop the same just prior to the stopping of said driving arm, whereby the final movement of said Geneva arm in relation to the stopped cam causes said dog to be disengaged.

13. A clutch mechanism as in claim 12, further characterized by means to rotate said driving arm farther about its axis whereby said driving element will move said Geneva arm at an accelerating angular velocity until said driving element passes said plane including said parallel axes, at which time said Geneva arm will be driven at a decelerating angular velocity, a notch on said notched disk adapted to be engaged by said dog to control the motion of said load member to a home position during said decelerating movement, and means to return said Geneva arm to its home position after said driving element leaves the radial slot of said Geneva arm.

14. In a clutch device of the kind including a continuously rotating drive element having a single notch, a normally stationary driven element coaxial with said drive element having a dog to engage said notch, and latch means normally holding said dog out of engagement with said drive element and said driven element in a predetermined angular position; means to release said driven element and said dog in time to permit said dog to engage said drive element in advance of said notch, and means to accelerate said driven element smoothly from its stationary condition to a speed approximately equal to that of said drive element, by the time said notch reaches said dog, and means to hold said latch means out of the path of said dog and said driven element during the running condition of said driven element.

15. A clutch device as described in claim 14, including means to return said latch means to position to intercept and latch said dog and said driven element, means to disengage said dog from said notch during the running condition of said driven element at a time when said driven element is approaching its stationary position, and decelerating means to control the movement of said driven element following the disengagement of said dog, said driven element at a predetermined rate to a relatively slow speed at the time it is intercepted by said latch means.

16. A clutch device as described in claim 15, wherein said decelerating means is adapted first to accelerate said driven element to an angular velocity higher than that of said driving element, whereby said dog is made free in said notch at the time it is disengaged therefrom.

ELLIOTT W. GARDINOR.
CURT I. JOHNSON.
EUGENE J. LAMB.

REFERENCES CITED

The following references are of record in the file of this patent:

UNITED STATES PATENTS

| Number | Name | Date |
|---|---|---|
| 2,049,690 | Cunningham | Aug. 4, 1936 |
| 2,199,561 | Fuller et al. | May 7, 1940 |
| 2,327,176 | Cory | Aug. 17, 1943 |